Oct. 29, 1929.  H. L. KUTTER  1,733,378
ROLL BALANCING
Filed Jan. 27, 1928
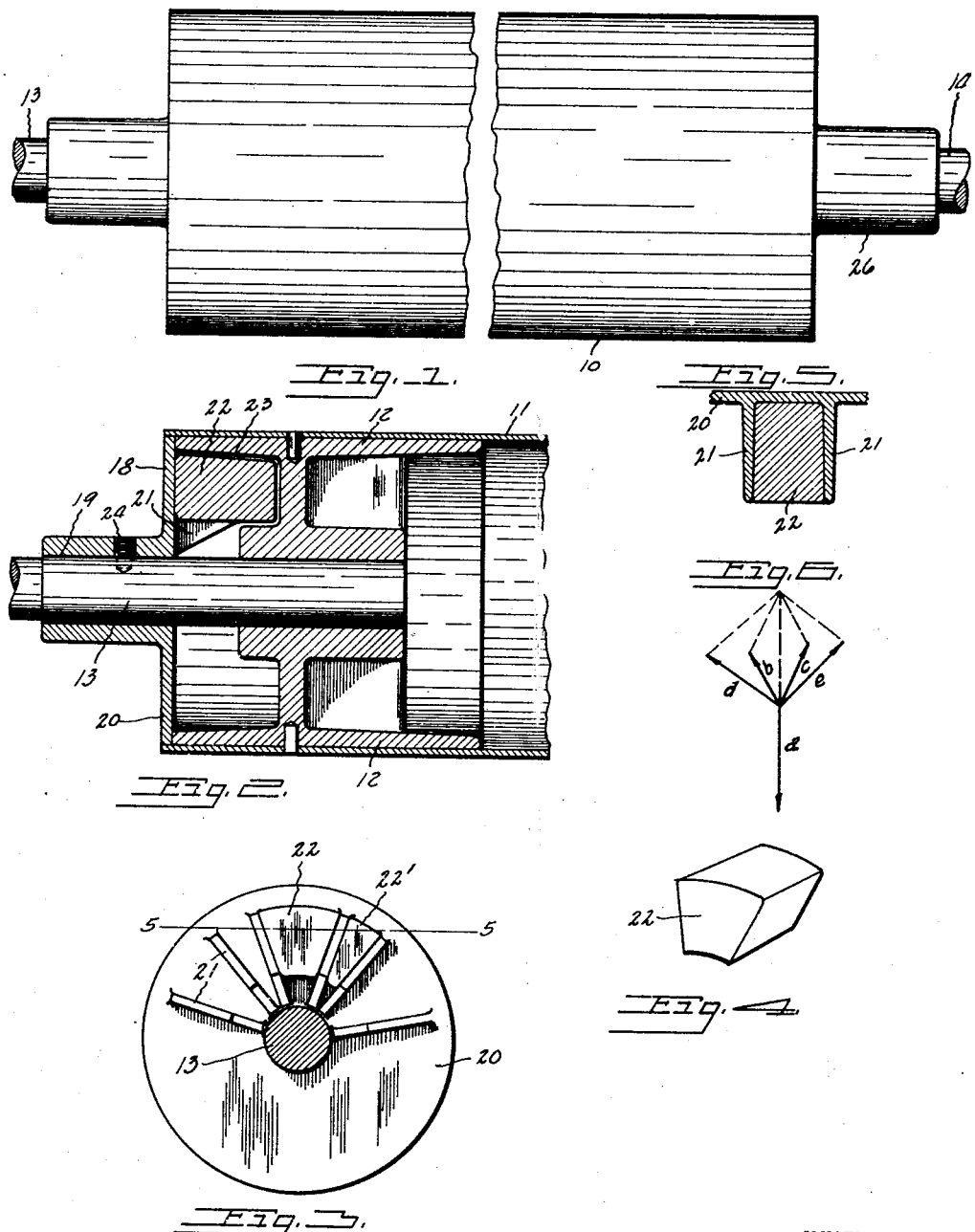
INVENTOR.
Herman L. Kutter
BY Maréchal and Noé
ATTORNEYS.

Patented Oct. 29, 1929

1,733,378

UNITED STATES PATENT OFFICE

HERMAN L. KUTTER, OF HAMILTON, OHIO, ASSIGNOR TO THE BLACK-CLAWSON COMPANY, OF HAMILTON, OHIO, A CORPORATION OF OHIO

ROLL BALANCING

Application filed January 27, 1928. Serial No. 249,912.

This invention relates to the balancing of rotatable members, and the primary object of the invention is to provide for the balancing of a rotatable member such as a roll, in a convenient and economical manner.

Another object of the invention is to provide means for balancing a rotatable member, this means comprising weight-holding devices which are relatively adjustable to bring the roll into a balanced condition, the weight-holding devices receiving a number of preformed weights.

Other objects and advantages of the invention will be apparent from the following description and from the drawings in which—

Fig. 1 is a side elevation of a roll embodying the present invention;

Fig. 2 is a central section through one end of the roll of Fig. 1;

Fig. 3 is a view of the inner end of one of the weight-carrying devices;

Fig. 4 is a perspective view of one of the balancing weights;

Fig. 5 is a section through the weight-holding device on the line 5—5 of Fig. 3; and Fig. 6 is a diagrammatic showing of balancing forces.

The invention is herein shown as applied to rotatable rolls such as are used in papermaking machines, although obviously it may be applied to balance rotatable members of other kinds. The rolls used in paper-making machinery are quite large and heavy and the pressure and wear on the bearings by which the roll is supported often becomes of very considerable magnitude. It is consequently important to balance the rolls to minimize vibration and wear as much as possible and to secure proper operation of the roll.

As shown in the drawings wherein the various parts are designated by reference numerals, the roll 10 embodies a cylindrical shell 11 which is securely fastened in place at its ends on the end walls 12. The construction of the roll is the same at either end and consequently a detailed description of only one end of the roll is given. The end wall 12 is firmly fixed on the inner end of a stub shaft 13, in the construction shown the end wall 12 being engaged with the end of the stub shaft by a force fit. The stub shaft 13 projects somewhat beyond the end of the roll and is adapted to be held in a suitable bearing at its outer end. A similar stub shaft 14 is provided at the other end of the roll, and the roll is thus rotatably mounted about the axis of the cylindrical shell.

The shaft 13 carries a weight-carrying or balancing member 18, the cylindrical bore 19 of which is a running fit with the outer diameter of the stub shaft so that the weight-carrying member may be moved axially along the shaft or may be rotated about the axis of the shaft until it is fixed in its adjusted position. As shown in Fig. 3 the weight-carrying member 18 comprises a disk or plate 20 from which project the weight-retaining ribs 21 which extend outwardly along one face of the plate, and which are provided in suitable spaced relation on at least one side of the axis of the disk plate. The weight-retaining ribs 21 are several in number, as shown, so that a number of preformed segmental shaped weights 22, (see Fig. 4) may be applied in a direction toward the center of the disk and be retained in position with the outer cylindrical surface of the weights in very close proximity to the inner slightly conical surface 23 of the end-wall flange. The various retaining or locating ribs are spaced apart in a definite manner so as to receive preformed weights of only one or two elemental shapes or size, the drawing showing the weight-retaining member having provision for receiving three large weights 22 in spaced-apart relation, and also two small weights 22′ which are preferably half the size of the larger weights. The end of the shell projects somewhat beyond the body of the end wall 12 so that the weight-carrying device may be supplied with weights 22 and then moved inwardly along the shaft 13 until it attains the position shown in Fig. 2, where the weights will be housed and retained by the projecting end-wall flange. After the weight-carrying device has been moved along the shaft axially to the position shown in Fig. 2, it may be rotatably adjusted on the roll about the axis of the shaft, and then locked in its adjusted position by a retaining bolt 24 which passes through a suitable hole provided in the weight-retaining device and into a radial hole which is provided in the stub shaft 13 after the proper position of the weight-retaining device has been determined.

At the other end of the roll a weight-retaining device 26 similar to the weight-retaining device 18 is provided, and the roll is properly balanced in the following manner. With the weight-retaining device on the stub shafts but not held in position by the bolts 24, the heavy side of the roll is determined by merely permitting the roll to rotate on its trunnions until the roll stops, with the heavy side down. The weight-retaining devices 18 and 26 are then each provided with one or two weights 22, or as many as four or five may be added to each of the weight-retaining devices in case the roll is very much out of balance. If the roll is only slightly out of balance there need be no addition of weights, as the mass of the weight-retaining ribs on one side of the axis of the weight-holding device may furnish a sufficient force moment. With the weights applied the devices 18 and 26 are moved along the stub shafts toward the center of the roll and temporarily held so that the weights are approximately opposite to the unbalanced side of the roll. The roll is again permitted to rotate freely and the heavy side of the assembly is again determined. The position of one or both of the weight-retaining devices is then adjusted by rotatably moving the devices about the center of the roll, the number of weights carried by each weight-retaining device, however, remaining the same unless it is found that insufficient number of weights were originally added to overcome the unbalanced tendency of the roll. It will obviously be necessary to add weights to each weight-retaining device, which would provide a turning amount at least equal to one-half the unbalanced turning amount of the roll. However the amount of weight added to each may exceed this amount considerably, in which case the weights of the weight-retaining devices are not directly opposite to the unbalanced or heavy side of the roll but rather at some angular displacement which will permit the balancing weights collectively to bring the roll to a condition of perfect balance. As shown in Fig. 6 if the direction and amount of unbalance of the roll itself is indicated by the arrow $a$ the roll may be brought into a state of perfect balance by weights at one end of the roll producing a moment having a direction and an amount as indicated by the arrow $b$, and by the weights at the other end of the roll having a moment and direction as indicated by the arrow $c$. The actual or numerical weight of the preformed weights 22 which are added to the weight-holding devices need not be known since the unbalance force $a$ can just as well be balanced by the two forces $d$ and $e$ produced by heavier weights but placed at the proper positions to produce a state of balance. After the proper positions of the weight-retaining devices have been determined so that the roll is balanced, the holes in the stub shaft are drilled and the weight-retaining devices are rigidly fixed in position by the bolts 24.

By reason of the preceding construction the balancing of a roll is easily accomplished merely by using a number of weights of preformed shape and size but in which the actual quantity or numerical value of the weight need not be known.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. A rotatable roll of the class described comprising a hollow cylindrical shell, a shaft projecting on each end of said shell, end-closure members fixed to the shaft and to the shell, a weight-holding device mounted on the shaft at each end of the shell outside the end-closure members, each device being adapted to receive preformed weights, and means for fixing the devices in position, whereby the roll may be balanced by adjusting the weight-holding devices about the axis of the roll and with respect to each other before they are fixed in position.

2. A rotatable roll of the class described having means for balancing the same, said means comprising a device having a plurality of provisions each adapted to receive a preformed weight so that a plurality of preformed weights may be variously positioned in said device, said device being relatively adjustable on said roll after the weights have been applied thereto, and means for holding said device in place on said roll.

3. A rotatable member of the class described having means for balancing the same, said means comprising a pair of weight-holding devices rotatably mounted on said member so that the devices are adjustable about the axis of the member and with respect to each other, each of said devices being adapted to variously receive and retain a plurality of preformed weights, and means for holding said devices in fixed position on the member after they have been adjusted about the axis of the member to balance the latter.

4. A rotatable roll of the class described comprising a cylindrical roll shell and a roll end member beyond which said shell extends, a shaft projecting from the said end member, a weight-holding device mounted on the shaft outwardly of said end member and movable axially on the shaft to positions outwardly of and substantially embraced by the extended shell end respectively, weight-receiving means in said weight-holding device whereby a plurality of preformed weights may be variously received and located in said device, and means for fixing said device with respect to said shell, whereby the roll may be balanced by adjusting the weight-holding device about the axis of the shaft.

5. A rotatable roll of the class described comprising a cylindrical roll shell and a roll end member beyond which said shell extends, a shaft projecting from the said end member, a weight-holding device mounted on the shaft outwardly of said end member and movable axially on the shaft to positions outwardly of and substantially embraced by the extended shell end respectively, said weight-holding device comprising an end disk and substantially radially extending walls projecting inwardly from said end disk defining substantially segmental shaped weight-receiving spaces in said weight-holding device whereby a plurality of preformed weights may be variously received and located in said device, and means for fixing said device with respect to said shell, whereby the roll may be balanced by adjusting the weight-holding device about the axis of the shaft.

6. A rotatable roll of the class described comprising a cylindrical roll shell and roll end members beyond which said shell extends, a shaft projecting outwardly from said roll end members, and a weight-holding device mounted on the shaft outwardly of each of said roll end members and movable axially on the shaft to positions outwardly of and substantially embraced by the extended shell ends respectively, said weight-holding devices each comprising an end disk and substantially radially extending walls projecting inwardly from said disk defining substantially segmental shaped weight-receiving spaces in said weight-holding device whereby a plurality of preformed weights may be variously received and located in said devices, and means for fixing said devices with respect to said shaft whereby the roll may be balanced by adjusting the weight-holding devices about the axis of the shaft and relatively to each other.

In testimony whereof I hereto affix my signature.

HERMAN L. KUTTER.

CERTIFICATE OF CORRECTION.

Patent No. 1,733,378.　　　　　　　　　　Granted October 29, 1929, to

HERMAN L. KUTTER.

It is hereby certified that error appears in the printed specification of the above numbered patent requiring correction as follows: Page 2, line 45, for the word "amount" read "moment"; and that the said Letters Patent should be read with this correction therein that the same may conform to the record of the case in the Patent Office.

Signed and sealed this 3rd day of December, A. D. 1929.

(Seal)

M. J. Moore,
Acting Commissioner of Patents.